Dec. 9, 1969   C. J. BARECKI ET AL   3,482,875
VEHICLE SEAT
Filed March 28, 1968   2 Sheets-Sheet 1
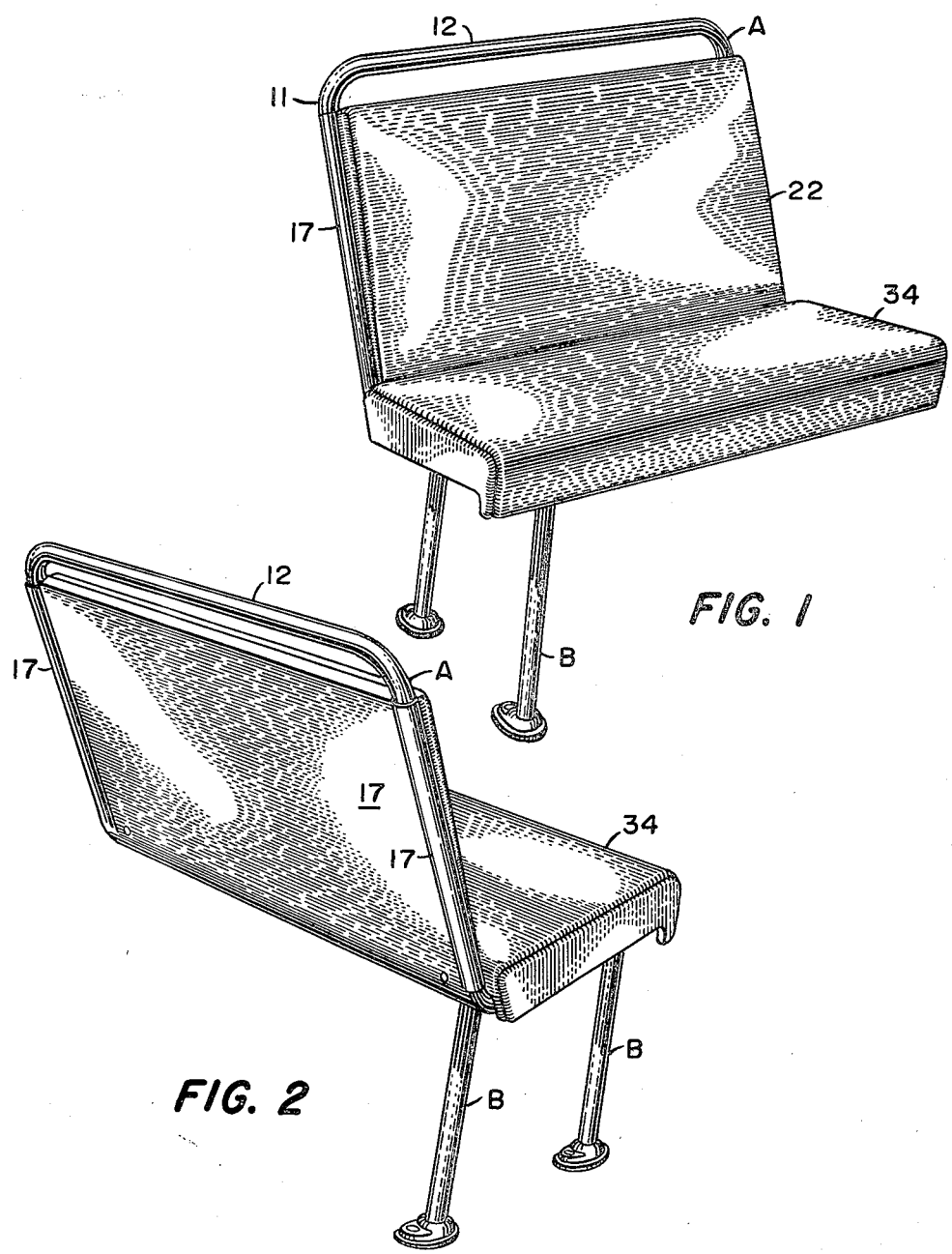
INVENTORS
Chester J. Barecki
Kenneth W. Hozeski
BY Dawson, Tilton, Fallon,
and Bungmus
ATTORNEYS Dec. 9, 1969  C. J. BARECKI ET AL  3,482,875
VEHICLE SEAT
Filed March 28, 1968  2 Sheets-Sheet 2
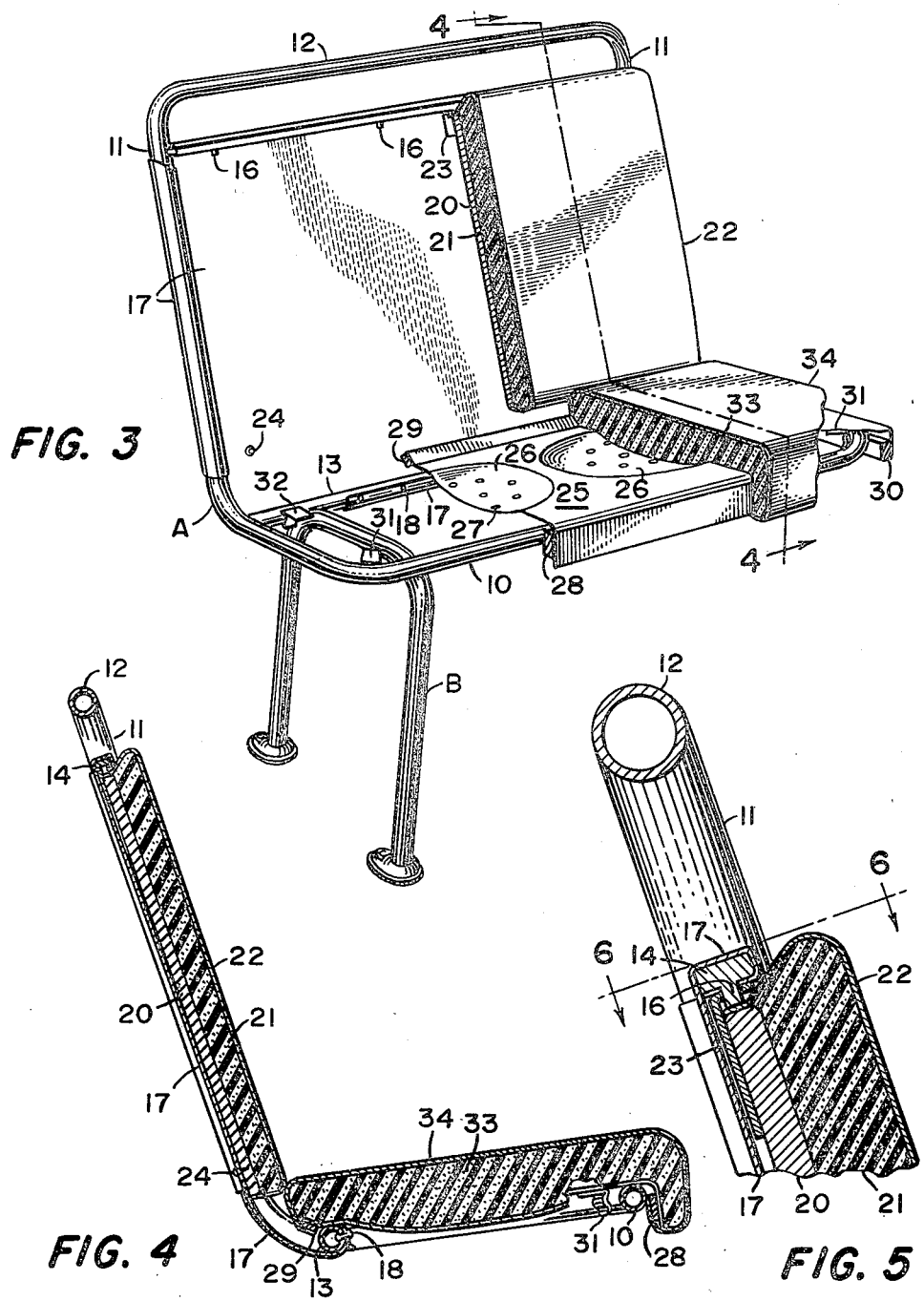
INVENTORS
Chester J. Barecki
Kenneth W. Hozeski
BY Dawson, Tilton, Fallon, and Lungmus.
ATTORNEYS

United States Patent Office 3,482,875
Patented Dec. 9, 1969

3,482,875
VEHICLE SEAT
Chester J. Barecki, Grand Rapids, and Kenneth W. Hozeski, Grandville, Mich., assignors to American Seating Company, Grand Rapids, Mich., a corporation of Delaware
Filed Mar. 28, 1968, Ser. No. 716,861
Int. Cl. A47c 7/24, 11/00
U.S. Cl. 297—456      6 Claims

ABSTRACT OF THE DISCLOSURE

A tubular frame provides a generally horizontal seat support and a generally vertical back support with a cross tube at the bottom of the back support and a cross bar spaced below the top of the back support. A trim or back panel of patterned metal has its top portion wrapped around and anchored to the cross bar and its bottom portion wrapped around the cross tube and its sides wrapped around the sides of the back support. A cushioned seat back is supported upon the back support and panel, and a seat cushion is carried by a recessed seat pan upon the seat support, the pan being provided at its edges with tacking strips.

SUMMARY

A tubular frame provides a seat support and a back support, the back support comprising generally vertical side rails and a top rail. A cross bar is spaced from the top rail and anchored to the side rails with the ends of the cross bar extending into openings in the side rails. A cross tube extends between the bottom portions of the side rails forming also a part of the seat frame. A back panel or trim panel of thin metal has its top portion wrapped around and anchored to the cross bar, and its bottom portion wrapped around and anchored to the cross tube, while its side portions are also wrapped around the side rails. A cushioned back is carried by the back panel and a cushioned seat is carried by the seat support.

The cushioned seat back is provided with a board. Fastening means extend through the panel and engage the board for supporting it upon the panel. Brackets at the top of the board are apertured to receive pins depending from the cross bar and the brackets support the top of the seat back.

A seat pan, which is preferably indented, supports a cushion. The pan is provided along its edges with inwardly-extending tacking strips. An upholstery cover extends over the cushion and has its edges secured to the tacking strip. The seat pan is preferably provided with spring clips which releasably anchor the pan to the seat frame members.

DRAWINGS

In the accompanying drawing, FIG. 1 is a perspective view of the front of the vehicle seat; FIG. 2, a perspective view of the back of the seat; FIG. 3, a view similar to FIG. 1 but having portions cut away to show the construction; FIG. 4, a vertical sectional view, the section being taken as indicated at line 4—4 of FIG. 3; FIG. 5, an enlarged broken sectional view, the section being taken as indicated at line 5—5 of FIG. 6; and FIG. 6, a broken plan sectional view, the section being taken as indicated at line 6—6 of FIG. 5.

DETAILED DESCRIPTION

In the illustration given, A designates a tubular frame which provides both a seat support and a back support. A horizontal portion 10 of the frame A provides a seat support, while a generally vertical portion provides a back support with side rails 11 and a top rail 12.

The frame A may be supported by a pedestal or leg member B on one side and by means carried by a side wall of the vehicle at the other side. It will be understood that any suitable means for supporting the seat may be provided.

A cross tube 13 extends between the bottom portion of the side rails 11 to connect the rails and also it provides a part of the seat support.

A cross bar 14, as shown best in FIG. 5, extends between the side rails 11 of the back frame. To anchor the ends of the cross rail 14, each side rail 11 is cut away to provide a slot and ears 15, formed by the cutaway portion, extend inwardly to bear against and grip the ends of the cross bar 14.

As shown best in FIGS. 3 and 5, the cross bar 14 is provided with a number of spaced depending pins 16 which are useful in providing a support for the seat back, as will be later described.

A trim panel or back panel 17 which is preferably formed of thin metal, such as, for example, patterned metal, is anchored to the cross tube and cross bar and side rails 11 by wrapping edge portions of the panel 17 about these members. The top portion of the metal panel 17 is wrapped around the cross bar 14, as shown in FIG. 5. The bottom portion of the panel 17 is wrapped around the cross tube 13, as shown in FIG. 4, and the wrapped portion may be secured by pop rivets 18 or by self-threading screws, etc. The sides of the panel 17 may be wrapped around the side rails 11 and secured thereto by pop rivets 19, as shown best in FIG. 6.

The seat back cushion is preferably provided with a board member 20, a resilient cushion 21, and upholstery 22. The board 20 is supported at its top by a number of bracket members 23 which have a forwardly-turned top portion that is apertured to receive the depending pins 16 of the cross bar 14.

In the assembly operation, the board 20 is pressed upwardly to the position shown in FIGS. 4 and 5, and screws 24 are passed through openings in the panel 17 and into the board 20. The brackets 23 and the screws 24 support the back cushion in place.

To support the seat cushion structure, a metal seat pan 25 which has two contoured recesses 26 containing ventilating holes 27 is placed in position, as shown in FIG. 3. The pan is equipped with a tacking strip 28 at the front of the pan, a tacking strip 29 at the rear of the pan, and tacking strips 30 at the ends of the pan. Secured to the bottom of the pan 25 and depending therefrom are spring clips 31 at the front corners and spring clips 32 at the rear corners. The clips grasp the seat tube when the pan is pressed downwardly upon the frame and releasably anchor the pan to the frame members 10 and 13. Attached to the seat pan is a cushion 33 held in place by an upholstery cover 34. The upholstery cover is secured to the tacking strips 28, 29 and 30.

The trim or back panel is slotted at 35 about the pins 16, as shown in FIG. 6, so that the cross bar 14 can be slid sideways and its ends fitted into the slots adjacent the ears 15 of the side rails 11, as shown in FIG. 6.

In the assembly operation, we prefer to attach the trim or back panel 17 to the tubular frame first by slipping the ends of the cross bar 14 into the slots of the side panels 11. Then the sides of the panel 17 are wrapped around the side rails and the bottom edge of the panel is wrapped tightly around the cross tube 13. We prefer to attach the back cushion next and, finally, the seat cushion is placed in position as above described.

While in the foregoing specification we have described a structure in considerable detail for the purpose of illustrating an embodiment of the invention, it will be understood that such details may be varied widely by those

What is claimed is:

1. In a vehicle seat, a tubular frame providing a seat support and a back support, said back support including generally vertical tubular side rails and a top cross member bridging said side rails, a back panel of thin metal having its top portion wrapped around said cross member and having its sides wrapped around said side rails and secured thereto, a cushion back resting against said back panel, and a seat carried by said seat support.

2. The structure of claim 1 in which said back support is provided with a top rail above said cross member and spaced therefrom.

3. The structure of claim 1 in which the cross tube extends between and is anchored to the bottom portion of said side rails and said back panel is wrapped around and secured to said cross tube.

4. The structure of claim 1 in which said cross member is in the form of a cross bar provided with depending pins extending through said wrapped portion of said panel.

5. The structure of claim 4 in which brackets for supporting said cushion back are apertured to receive said depending pins.

6. In a vehicle seat, a tubular frame providing a seat support and a back support, said back support comprising generally vertical side rails and a top rail, a cross bar spaced from said top rail and anchored to said side rails, a cross tube extending between and anchored to the bottom portions of said side rails, a back panel of thin metal having its top portion wrapped about said cross bar and its bottom portion wrapped about said cross tube and having also its side portions wrapped around said side rails to form tubular columns around said side rails, means securing said columns to said side rails, a cushion back covered by said back panel, and a cushion seat carried by said seat support.

References Cited

UNITED STATES PATENTS

| | | | |
|---|---|---|---|
| 2,255,327 | 9/1941 | Morgan | 297—460 X |
| 2,343,505 | 3/1944 | Gedris | 297—452 |
| 2,553,042 | 5/1951 | Hoven et al. | 297—460 X |
| 2,845,111 | 7/1958 | Barecki et al. | 297—232 |
| 3,114,578 | 12/1963 | Hamilton | 297—460 |
| 3,323,835 | 6/1967 | Barecki | 297—460 |

CASMIR A. NUNBERG, Primary Examiner

U.S. Cl. X.R.

297—445